(12) United States Patent
Giacobbe et al.

(10) Patent No.: US 6,620,388 B1
(45) Date of Patent: *Sep. 16, 2003

(54) CATALYST PIPE

(75) Inventors: Francesco Giacobbe, Rome (IT); Renzo Coletti, Monte Silvino (IT)

(73) Assignees: Mannesmann Aktiengesellschaft, Düsseldorf (DE); K.T.I. Group B.V., Zoetermeer (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,713

(22) PCT Filed: Mar. 15, 1996

(86) PCT No.: PCT/DE96/00489

§ 371 (c)(1), (2), (4) Date: Oct. 22, 1997

(87) PCT Pub. No.: WO96/30116

PCT Pub. Date: Oct. 3, 1996

(30) Foreign Application Priority Data

Mar. 28, 1995 (DE) .......................... 195 12 945

(51) Int. Cl.⁷ ................ B01J 8/00; B01J 8/02; F28D 21/00
(52) U.S. Cl. ............ 422/197; 422/196; 422/202; 165/172; 165/183
(58) Field of Search ................ 422/197, 202, 422/203, 218, 216, 204, 205, 196, 198; 165/183, 172

(56) References Cited

U.S. PATENT DOCUMENTS

| | | | | |
|---|---|---|---|---|
| 3,666,423 A | | 5/1972 | Muenger | 422/200 |
| 4,518,113 A | * | 5/1985 | Pellegri | 228/170 |
| 4,714,593 A | * | 12/1987 | Naito et al. | 422/197 |
| 5,172,476 A | | 12/1992 | Joshi | 29/890.053 |
| 5,185,106 A | * | 2/1993 | Chen et al. | 261/112.2 |
| 5,271,151 A | | 12/1993 | Wallis | 29/890.053 |
| 5,699,855 A | * | 12/1997 | Mitsuhashi | 165/133 |

FOREIGN PATENT DOCUMENTS

| | | | |
|---|---|---|---|
| AT | 320 393 | | 2/1975 |
| DE | 19 01 758 | | 8/1970 |
| DE | 28 03 138 | | 7/1979 |
| EP | 0 080 270 | | 6/1983 |
| EP | 324670 | * | 7/1989 |
| GB | 2201903 | * | 3/1987 |

* cited by examiner

*Primary Examiner*—Jerry D. Johnson
*Assistant Examiner*—Alexa Ann Doroshenk
(74) *Attorney, Agent, or Firm*—Cohen, Pontani, Lieberman & Pavane

(57) ABSTRACT

Disclosed is a catalytic pipe for an endothermic catalytic reaction of a process medium, with an outer cladding tube which is tightly closed at its end sides by a first base and a second base. A rising pipe arrangement is arranged in the interior of the cladding tube and is connected, in the vicinity of the first base, with an outlet which is guided outward for the product resulting from the catalysis of the process medium. According to the invention, the rising pipe arrangement is formed by a plurality of line strands which end in a collector which is connected to the outlet for the product.

15 Claims, 3 Drawing Sheets

CATALYST PIPE

PRIORITY CLAIM

This is a U.S. national stage of application No. PCT/DE96/00489, filed on Mar. 15, 1996. Priority is claimed from that application and from the following applications: German Application No.: 195 12 945.8, Filed: Mar. 28, 1995.

BACKGROUND OF THE INVENTION

The invention is directed to a catalytic pipe for an endothermic catalyst reaction of a process medium.

Endothermic catalytic reactions are generally carried out in reaction spaces constructed in the shape of elongated tubes or pipes which are filled with a bulk particulate catalyst. The process medium to be processed by the endothermic reaction is introduced at one end of the catalytic pipe and discharged at the other end. In order to maintain the reaction, the pipe jacket or pipe casing is acted upon by a heating medium so that an indirect transfer of heat can take place in relation to the process medium. A reactor constructed in this manner has the disadvantage that the heat contained in the product formed by the catalytic reaction is discharged from the reactor space along with this product. This results in a correspondingly high energy consumption.

In order to reduce energy consumption, it is known to form the catalytic pipes as regenerative catalytic pipes. A corresponding reactor is described in EP 0 369 556 B. A basic illustration of this catalytic pipe is shown in the form of a longitudinal section and a cross section in FIGS. 6 and 7. The catalytic pipe has an elongated (e.g., 3 to 14 m length) outer cladding tube 1 which can be heated externally, e.g., by hot flue gases. The two end sides of the cladding tube 1 are tightly closed by bases 2 and 3, wherein the upper base 2 is constructed as a removable flange cover which allows the particulate catalyst to be introduced. In the interior of the cladding tube 1, a rising pipe 6 is arranged coaxial to the longitudinal axis of the cladding tube 1, extends substantially along the entire length of the cladding tube 1, and terminates the lower part near to the base 3 so as to leave open a through-gap. In the upper part, the rising pipe 6 is guided laterally through the casing of the cladding tube 1. A feed line 9 for the process medium to be supplied is arranged just below the base 2. The product formed by the catalytic reaction can be discharged below the base 2 through the outlet 4. The annular intermediate space between the inner surface of the cladding tube 1 and the outer surface of the rising pipe 6 is filled with a bulk particulate catalyst 5. When the process medium is directed downward over the catalyst 5 via the feed line 9 and the cladding tube 1 is heated externally, an indirect heat transfer exchange takes place from the heating medium to the process medium, so that the process medium is heated to the reaction temperature and the endothermic reaction is maintained by the transfer of heat. The endothermic catalytic reaction is concluded as soon as the medium to be processed has left the catalytic bath and arrived in the region of the lower base 3. The direction of flow of the medium reverses in this region and the formed product is directed upward through the rising pipe 6 and discharged through the outlet 4. The product flowing past the inner wall of the rising pipe 6 can give off heat to the process medium through the wall of the rising pipe 6. In this way, at least a considerable portion of the heat contained in the product can be recovered and used to carry out the endothermic reaction. In order to intensify the indirect heat exchange between the product and the process medium, a heat transfer promoter which is constructed as a flow displacement body 8 is arranged coaxially in the interior of the rising pipe 6. In the shown example, this heat transfer promoter is designed as a tubular hollow body and is tightly closed at its upper end face so that the product cannot flow through the interior of the flow displacement body 8. Instead, the flow is compelled to flow through the annular gap 7 between the rising pipe 6 and the flow displacement body 8. The flow velocity of the product is accordingly noticeably increased and the heat exchange rate is increased. However, while this solution is advantageous with respect to heat exchanger technique, the volume occupied by the flow displacement body 8 cannot be used.

A reactor which is outfitted with catalytic pipes that are constructed in a similar manner to regenerative catalytic pipes is known from GB 22 01 903. However, instead of an individual rising pipe, a rising pipe arrangement comprising two rising pipes is arranged in the interior of the cladding tube. The rising pipes run partially parallel to one another and partially in the shape of a helical line in the longitudinal direction. Accordingly, the ratio of the outer surface of the rising pipe arrangement to the flow cross section for the product gas is greater than with an individual rising pipe having the same flow cross section. Accordingly, the heat exchange between the product gas and the process gas guided through the catalyst bed is improved.

An object of the invention is to provide a catalyst pipe having improved heat transfer characteristics and which exhibits an efficient use of the pipe volume for the catalyst bed.

SUMMARY OF THE INVENTION

The above stated object is obtained by a catalyst pipe of the invention.

In the invention, a catalyst pipe is formed of an outer cladding tube which is tightly sealed at its end sides by a first base and a second base. One of the bases can be opened to introduce a catalyst into the tube. The tube is externally heatable by a heating medium. A feed line for supplying the process medium to the catalyst filling is also provided.

A rising pipe arrangement of at least one line strand is arranged in the interior of the cladding tube and is preferably substantially coaxially arranged with the cladding tube. The rising pipe arrangement terminates in a collector which is connected in the vicinity of the base with an outwardly directed outlet for the product formed by the catalysis of the process medium. The rising pipe arrangement terminates shortly before the second base of the cladding tube so as to leave a through-gap. A catalyst filling is arranged in the intermediate space between the cladding tube and rising pipe arrangement.

The line strand can be formed of a plurality of separate pipes and a plurality of line strands can be combined to form a physical unit. Optionally, the pipe sections can be flattened or corrugated and welded together. The one or more line strands can be arranged in an approximate star-shaped cross section. Preferably the surface ratio of the cladding tube outer surface to the outer surface of the rising pipe arrangement is less and 3.0 and the cladding tube cross section area is reduced by less than 20%.

The various features of novelty which characterize the invention are pointed out with particularity in the claims annexed to and forming a part of this specification. For a better understanding of the invention, its operating advantages and specific objects obtained by its use, reference should be made to the accompanying drawings and descriptive matter in which there is illustrated and described a preferred embodiment of the invention.

DESCRIPTION OF PREFERRED EMBODIMENT

Figure 1:
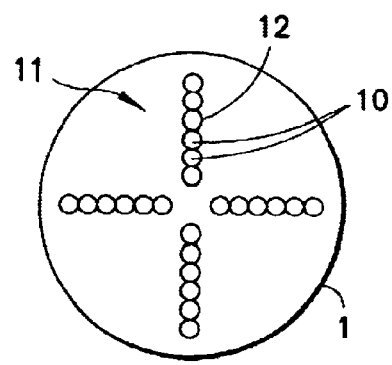
FIG. 1 shows a schematic cross section of a catalytic pipe according to the invention.
Figure 4:
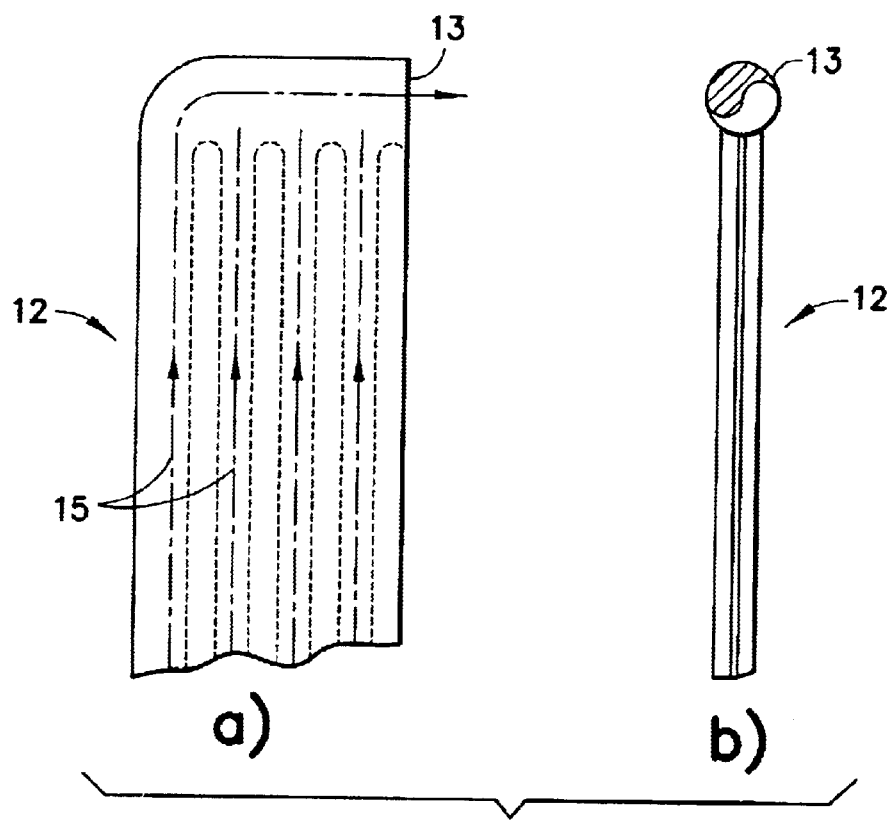
FIG. 4 shows the front and side view of a line strand unit.
Figure 6:
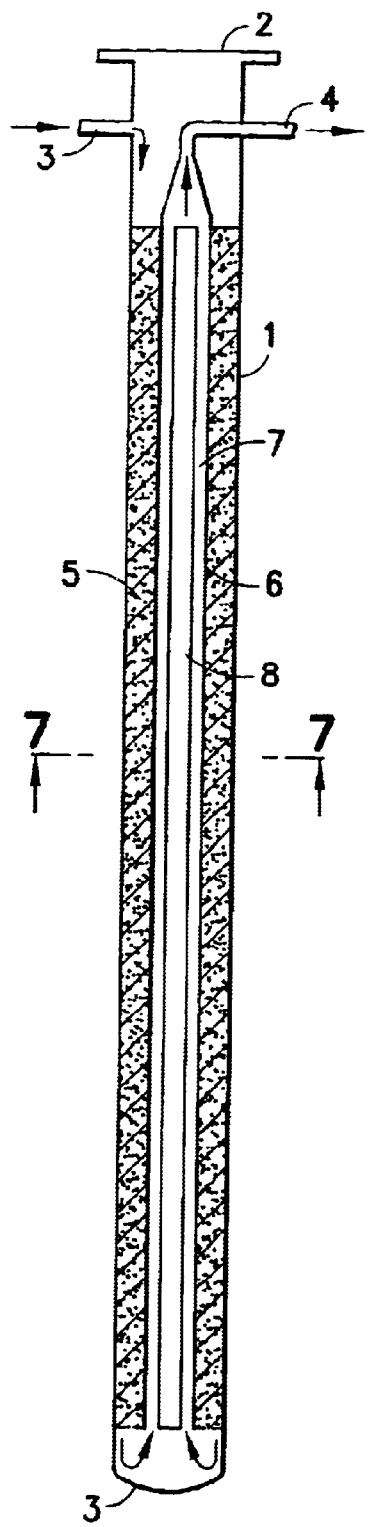
FIG. 6 shows a longitudinal section through a known regenerative catalytic pipe.
Figure 7:
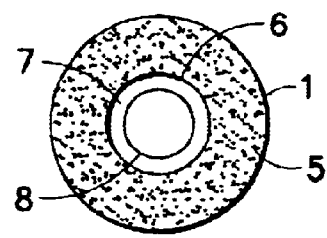
FIG. 7 shows a cross section through the catalytic pipe according to FIG. 6.

The basic construction of a catalytic pipe according to the invention is similar to the construction of a conventional regenerative catalytic pipe as is shown in FIGS. 6 and 7 as is already explained above. Instead of a central rising pipe 6 with a flow displacement body 8 arranged coaxially therein, the invention, as is shown in FIG. 1, provides a plurality (e.g., at least 5 or 10) of line strands 10 as a rising pipe arrangement, these line strands 10 extending in a corresponding manner over the entire axial length of the bed of the catalyst 5 and terminating just above the lower base 3 so that a sufficient through-gap remains between the lower end side of the line stands 10 and the base 3 for discharging the product. The individual line strand tubes can be connected or secured to one another along their length in the catalyst filling, with a contact between the tubes along a longitudinal line so that a corrugated surface can be obtained. The individual line strands 10 end in a collector 13 which is shown in FIG. 4 and which will be explained in more detail hereinafter. The outlet 4 is connected to the collector 13 corresponding in FIG. 6.

Referring to the schematic view in FIG. 1 the line strands 10 are combined in groups, each group forming a physical unit or line strand unit 12. The individual line strands 10 do not contain a flow displacement body. Rather, their entire cross section is available for transporting the product. For this reason, the entire cross-sectional area required for the rising pipe arrangement can be reduced compared to the prior art according to FIG. 6. The cross-sectional area occupied by the flow displacement body 8 in FIG. 6 can be made use of in its entirety in the construction according to the invention and is thus available for increasing the surface proportion for the introduction of catalyst.

The individual line strands 10 lie directly next to one another without any intermediate space, are rigidly secured to one another, and each has a relatively small cross section. The ratio of the outer surface of a line strand unit 12 to its flow cross section for the product gas is therefore substantially greater than in the known reactor according to GB 22 01 903 A.

As can be seen from FIG. 1, it is advantageous to arrange the line strand units 12 in an approximately star-shaped pattern in cross section or to orient the line strand units 12 with their transverse axis radial to the longitudinal axis of the cladding tube 1. More than one, and preferably at least three or four, line strand units 12 should advisably be provided, so that an effective, large-volume heat transfer can be effected from the product to the process medium. On the other hand, such an arrangement does not hinder the heat exchange between the heating medium, which is brought up to the cladding tube 1 from the outside, and the process medium. Since the individual line strand units 12 already comprise a plurality of (e.g., at least 3, 4 or 5) line strands 10, the rising pipe arrangement 11 of a catalytic pipe according to the invention generally includes more than 10, preferably at least 20, individual line strands.

Figure 2:
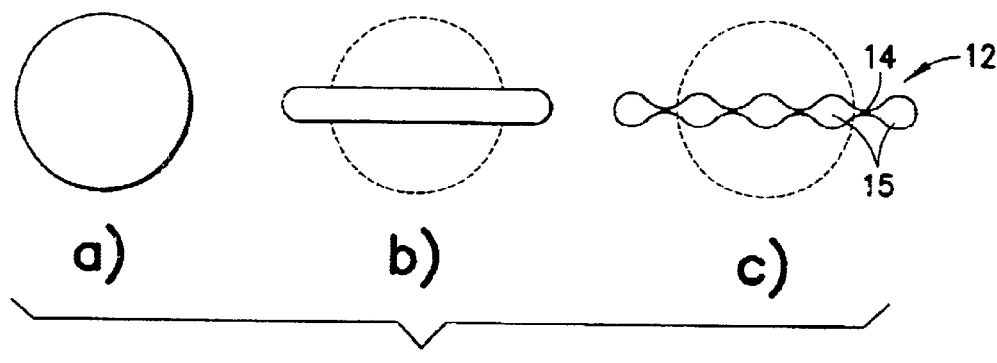
FIG. 2 shows different stages in the production of a line strand unit for a catalytic pipe according to the invention.
Figure 3:
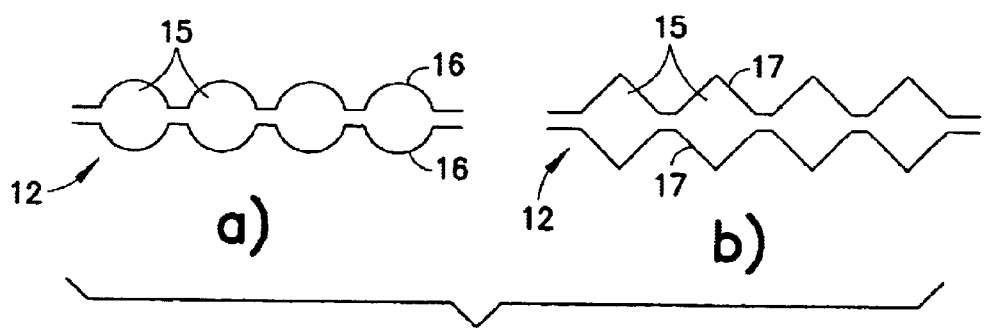
FIG. 3 shows schematic sectional diagrams for the alternative production of a line strand unit.

FIG. 2 is a schematic view showing how a coherent line strand unit 12 can be produced from a simple smooth pipe, e.g., with a diameter of 25 mm. In FIG. 2, a) shows the undeformed pipe and b) shows the pipe in a flat compressed shape. However, the compression is only effected up to the point where a sufficient cross section still remains in the interior for the flow of product. In a further processing step whose results are shown in part c) of FIG. 2, beads 14 are formed on the flat sides of the compressed pipe in its longitudinal direction, so that the inner walls of the pipe located opposite one another have an extended or line type contact at a plurality of locations (four locations in the shown example) and form flow ducts 15 therebetween, which flow ducts 15 are closed off from one another. Whether these flow ducts 15 are completely isolated from one another or whether they partially or completely communicate with one another along the longitudinal axis is not essential to the function of the invention. However, a line strand with the flat shape shown in part b) would be poorly suited, since it would be deformed in an uncontrolled manner by the pressing action of the catalyst material due to thermal expansion and shrinkage as a result of the inevitable startup and shutdown processes during the operation of a catalyst pipe according to the invention. Thus, it is important to construct the cross sections of the line strands in such a way that they offer a sufficient deformation resistance against the influence of external pressure. In this respect, line strand units 12 assembled from standard round individual pipes are recommended. An alternate embodiment for producing a line strand unit 12 can be seen in FIG. 3, wherein two plates 16 and 17 which are corrugated in the longitudinal direction are placed one upon the other and tightly connected (e.g., welded) at the longitudinal sides in such a way that flow ducts 15 extending in turn in the axial direction are formed in the corrugated region. The corrugations can be substantially round as in a) or triangular in cross section as in b), or can be shaped in some other way. It is only necessary that continuous flow ducts are formed between the plates 16, 17 which are placed one upon the other.

FIG. 4 shows a line strand unit 12 in a front view and side view. The flow direction of the product to be discharged is indicated by arrows inside the flow ducts shown in dashes. In the upper part of the line strand unit 12, all of the flow ducts 15 end in a collector 13. The collector 13 is connected to the outlet 4 corresponding to FIG. 6.

Figure 5:
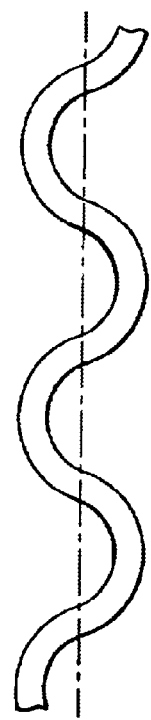
FIG. 5 shows a line strand unit extending in a serpentine manner.

FIG. 5 shows a plan view of the narrow front side of a line strand unit 12 which is bent along its longitudinal course in a serpentine manner. A construction of this kind offers advantages with respect to compensating for thermal longitudinal expansion and leads to a further increase in the ratio of the outer surface and flow cross section. A corresponding result is achieved by a construction, e.g., in the shape of a helical line, as well.

In order to ensure a good heat recovery rate, the surface ratio of the outer surface of the cladding tube 1 to the outer surface of the rising pipe arrangement 11 should be less than 3. A preferred range for this ratio is between 1.0 and 2.5, wherein a ratio of 1.9 is especially preferred. The configuration of the cross-sectional form of the rising pipe arrangement 11 should be effected in such a way that the reduction in the remaining average cross section of the cladding tube 1 by the rising pipe arrangement 11 is less than 20%, and preferably less than 10%. In particular, the reduction in cross-sectional area is preferably limited to a range of approximately 1 to 5%, and most preferably to approximately 2%. This can easily be influenced by the number of flow ducts, that is, the number of line strands 10, inside the line strand units. The greater the number of flow ducts, the greater its outer surface, i.e., the smaller the surface ratio. Since, according to the invention, the rising pipe arrangement is divided into a plurality of connected line strands 10, a large surface can be created for the heat transfer between the process medium and the product flow with a comparatively extremely small space requirement. In this way, it is possible for the regenerative catalytic pipe to have such a compact construction that its diameter is not significantly greater than a conventional catalytic pipe with a single linear flow passage while maintaining the same catalyst volume, but so that the heat exchanger characteristics are at least as good and often even better (lower heat energy requirement) than a regenerative catalytic pipe with an individual rising pipe and with an appreciably larger diameter. The rising pipe arrangement 11 according to the invention also has great advantages in terms of thermal engineering over a rising pipe arrangement comprising two individual rising pipes which are bent in the shape of a helical line, since the ratio of the outer surface and through-cross section for the product medium is considerably greater. It is easily possible to adapt to thermal engineering requirements in that, for example, the selection of the degree of surface deformation (quantity of beads) of the pipe used as starting material varies correspondingly, e.g., when producing the rising pipe units according to FIG. 2.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

What is claimed is:

1. A catalyst pipe for an endothermic catalyst reaction of a process medium to form a product, comprising:
    an outer cladding tube which is tightly sealed at its end sides by a first base and a second base, wherein one of the bases comprises means for introducing a catalyst into said tube, said tube having an interior and a longitudinal axis and being adapted for external heating by a heating medium;
    rising pipe arrangement in the interior of the cladding tube forming an intermediate space therein, said rising pipe arrangement terminating in a collector and connected in a vicinity near the first base with an outwardly directly outlet for the product formed by the catalyst reaction of the process medium; and
    a catalyst filling arranged in the intermediate space between the cladding tube and the rising pipe arrangement; wherein the rising pipe arrangement terminates before the second base of the cladding tube so as to leave a through-gap, and wherein a feed line for supplying the process medium to the catalyst filling is arranged in the vicinity of the first base of the cladding tube,
    wherein the rising pipe arrangement comprises at least one physical unit, having an outer corrugated surface,
    wherein each physical unit comprises at least two line strands, shaped as individual tubular elements, connected to one another only along a longitudinal contact line,
    and wherein, out of this longitudinal contact line, the whole outer surface of the line strands is in contact with the catalyst filling.

2. The catalyst pipe of claim 1, wherein the physical unit is formed of a plurality of separate pipes.

3. The catalyst pipe of claim 1, wherein said rising pipe arrangement is substantially coaxial to said cladding tube.

4. The catalyst pipe of claim 1, wherein there is a plurality of physical units and said physical units are arranged in an approximately star-shaped pattern in cross section.

5. The catalyst pipe of claim 1, wherein the physical unit has a transverse axis and is arranged with said transverse axis radial to the longitudinal axis of the cladding tube.

6. The catalyst pipe of claim 1, wherein a plurality of physical units are provided.

7. The catalyst pipe of claim 6 wherein at least three physical units are provided.

8. The catalyst pipe of claim 1, wherein the cladding tube has an outer surface area and the rising pipe arrangement has an outer surface area and the surface area ratio of the outer surface area of the cladding tube to the outer surface area of the rising pipe arrangement is less than 3.0.

9. The catalyst pipe of claim 8, wherein the surface ratio lies between 1.0 and 2.5.

10. The catalyst pipe of claim 9 wherein the surface ratio is approximately 1.9.

11. The catalyst pipe of claim 1, wherein the rising pipe arrangement is so dimensioned that the surface area of the average cross section of the cladding tube is reduced by the rising pipe arrangement by less than 20%.

12. The catalyst pipe of claim 11, wherein the reduction in cross-sectional area is in the range of from 1% to 5%.

13. The catalyst pipe of claim 12 wherein the reduction is approximately 2%.

14. The catalyst pipe of claim 11 wherein the reduction is less than 10%.

15. The catalyst pipe of claim 1, wherein the physical unit is bent in the longitudinal direction in a serpentine shape or in the shape of a helical line.

* * * * *